United States Patent
Choi et al.

(10) Patent No.: US 12,225,457 B2
(45) Date of Patent: Feb. 11, 2025

(54) METHOD OF CONTROLLING PLURALITY OF CELLS FOR PROVIDING RADIO RESOURCES TO PLURALITY OF USER EQUIPMENTS, AND ELECTRONIC DEVICE FOR PERFORMING THE METHOD

(71) Applicant: Samsung Electronics Co., Ltd., Suwon-si (KR)

(72) Inventors: Minsuk Choi, Suwon-si (KR); Kyungrae Kim, Suwon-si (KR); Taejeoung Kim, Suwon-si (KR); Juhwan Song, Suwon-si (KR); Taeseop Lee, Suwon-si (KR); Seowoo Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 17/513,172

(22) Filed: Oct. 28, 2021

(65) Prior Publication Data
US 2022/0141766 A1    May 5, 2022

Related U.S. Application Data

(63) Continuation of application No. PCT/KR2021/011576, filed on Aug. 30, 2021.

(30) Foreign Application Priority Data

Nov. 2, 2020    (KR) .................. 10-2020-0144589

(51) Int. Cl.
*H04W 52/02* (2009.01)
*H04W 24/08* (2009.01)

(52) U.S. Cl.
CPC ....... *H04W 52/0206* (2013.01); *H04W 24/08* (2013.01)

(58) Field of Classification Search
CPC ..... H04W 24/02; H04W 24/08; H04W 52/02; H04W 52/0232; H04W 52/0206;
(Continued)

(56) References Cited

U.S. PATENT DOCUMENTS 8,862,074 B2   10/2014  Hamalainen
11,160,000 B2  10/2021  Kim et al.
(Continued)

FOREIGN PATENT DOCUMENTS

CN      103563438      2/2014
EP      2 892 300 A1   7/2015
(Continued)

OTHER PUBLICATIONS

International Search Report dated Dec. 2, 2021 in corresponding International Application No. PCT/KR2021/011576.
(Continued)

*Primary Examiner* — Quoc Thai N Vu
(74) *Attorney, Agent, or Firm* — NIXON & VANDERHYE P.C.

(57) ABSTRACT

Disclosed is a method, performed by an electronic device, of controlling a plurality of cells for providing radio resources to a plurality of user equipments (UEs), including: obtaining information about a load of each of a plurality of cells, calculating a total load of the plurality of cells based on the obtained information, changing a state of at least one cell from among the plurality of cells from an active state to an inactive state or from an inactive state to an active state based on the calculated total load, and controlling the plurality of cells so that a plurality of UEs are connected to active cells from among the plurality of cells in response to the change in the state of the at least one cell.

11 Claims, 8 Drawing Sheets

(58) Field of Classification Search
CPC .... H04W 16/08; H04W 52/343; Y02D 30/70; G06N 3/02; G06N 20/00
See application file for complete search history.

(56) References Cited

U.S. PATENT DOCUMENTS

| | | | |
|---|---|---|---|
| 2009/0197603 A1* | 8/2009 | Ji | H04W 36/00835 455/436 |
| 2012/0063377 A1* | 3/2012 | Osterling | H04W 72/52 370/329 |
| 2013/0294272 A1* | 11/2013 | Xiao | H04W 52/0206 370/252 |
| 2016/0044515 A1 | 2/2016 | Wang et al. | |
| 2016/0249264 A1 | 8/2016 | Axen et al. | |
| 2019/0380082 A1 | 12/2019 | Kim et al. | |
| 2020/0068418 A1 | 2/2020 | Courington et al. | |
| 2020/0187113 A1* | 6/2020 | Mwanje | H04W 28/0257 |

FOREIGN PATENT DOCUMENTS

| | | |
|---|---|---|
| KR | 10-2018-0098085 | 9/2018 |
| WO | 2017/176293 | 10/2017 |

OTHER PUBLICATIONS

Nokia Siemens Networks, "Definition of *CandidateCell-LoadParameters", S5-121714, 3GPP TSGSA5 (Telecom Management) Meeting #84, Berlin, Germany, Aug. 20-24, 2012.
3GPP TSG-SA5, S5-121714, "Telecom Management Meeting #84 Report", Aug. 20-24, 2012, 8 pages.
Extended European Search Report dated Feb. 23, 2024 for EP Application No. 21886523.6.
Korean Office Action dated Dec. 11, 2024 for KR Application No. 10-2020-0144589.

* cited by examiner

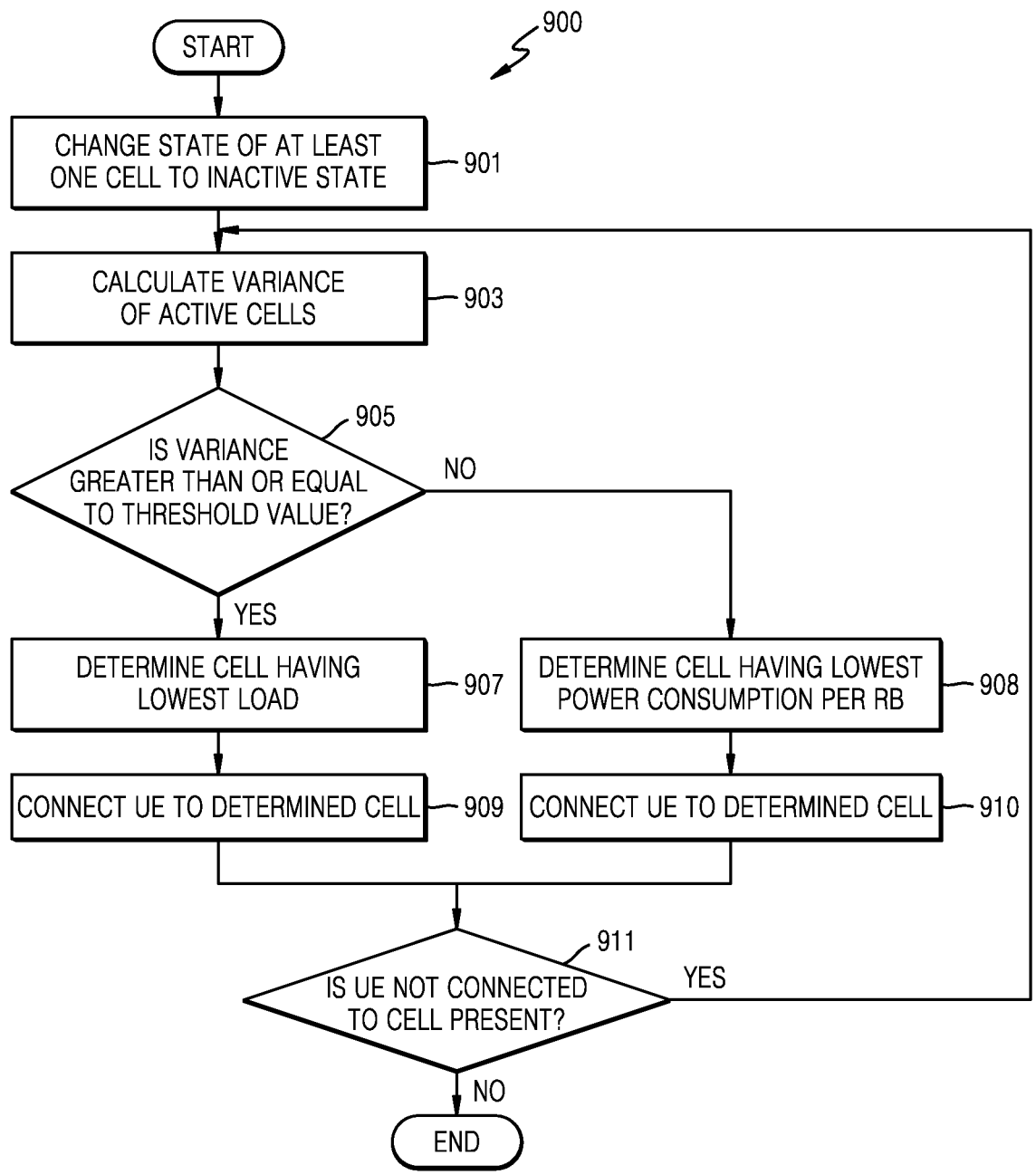

METHOD OF CONTROLLING PLURALITY OF CELLS FOR PROVIDING RADIO RESOURCES TO PLURALITY OF USER EQUIPMENTS, AND ELECTRONIC DEVICE FOR PERFORMING THE METHOD

CROSS-REFERENCE TO RELATED APPLICATIONS

This application is a continuation of International Application No. PCT/KR2021/011576 designating the United States, filed on Aug. 30, 2021, in the Korean Intellectual Property Receiving Office and claiming priority to Korean Patent Application No. 10-2020-0144589, filed on Nov. 2, 2020 in the Korean Intellectual Property Office, the disclosures of which are incorporated by reference herein in their entireties.

TECHNICAL FIELD

The disclosure relates to a method of controlling a plurality of cells for providing radio resources to a plurality of user equipments (UEs), and an electronic device for performing the method.

BACKGROUND ART

Due to the development of communication technology, users may perform various types of tasks by communicating with a base station using user equipments (UEs). For example, the users may send or receive voice or text messages, play audio or video, or access the Internet using their UEs.

The base station may configure an access network together with a plurality of UEs in order to provide a wireless communication service to the UEs. The base station, as an access network device, may include a plurality of sectors, and each sector may include a plurality of cells based on frequency bands. The UEs may be connected to any one of the plurality of cells to receive an allocation of radio resources, and perform various tasks using the allocated radio resources.

DISCLOSURE

Technical Problem

The number of user equipments (UEs) connected to each cell may continuously change, and a load in each cell may continuously change depending on the number of the connected UEs. For example, a relatively large number of UEs may be connected to any one cell, and a relatively small number of UEs may be connected to any other cell. Different numbers of UEs may be connected to a plurality of cells, load may be concentrated on a specific cell, and total network performance may be reduced.

In addition, the cells may have different power consumption efficiencies depending on frequency bands of provided radio resources or configured hardware characteristics. Although equal numbers of UEs are connected to the cells, when a large number of UEs are connected to a cell having a relatively low power consumption efficiency, total power consumption may be greatly increased. When power consumption is increased, costs for operating a base station may be increased and thus efficiency of a wireless communication service may be reduced.

Technical Solution

According to an example embodiment of the disclosure, a method includes: obtaining information about a load of each of a plurality of cells, calculating a total load of the plurality of cells based on the obtained information, changing a state of at least one cell from among the plurality of cells from an active state to an inactive state or from an inactive state to an active state based on the calculated total load, and controlling the plurality of cells so that a plurality of user equipments (UEs) are connected to active cells from among the plurality of cells, in response to the change in the state of the at least one cell.

According to an example embodiment of the disclosure, an electronic device includes: a plurality of cells, a memory, and at least one processor electrically connected to the memory and the plurality of cells, the processor configured to control the electronic device to: obtain information about a load of each of the plurality of cells, calculate a total load of the plurality of cells based on the obtained information, change a state of at least one cell from among the plurality of cells from an active state to an inactive state or from an inactive state to an active state based on the calculated total load, and control the plurality of cells so that a plurality of user equipments (UEs) are connected to active cells from among the plurality of cells, in response to the change in the state of the at least one cell.

DESCRIPTION OF DRAWINGS

The above and other aspects, features, and advantages of certain embodiments of the present disclosure will be more apparent from the following detailed description, taken in conjunction with the accompanying drawings, in which:

FIG. 9 is a flowchart illustrating an example method of controlling a plurality of cells in response to a change in a state of at least one cell, according to various embodiments.

In the drawings, like reference numerals denote like elements.

MODE FOR INVENTION

Figure 1:
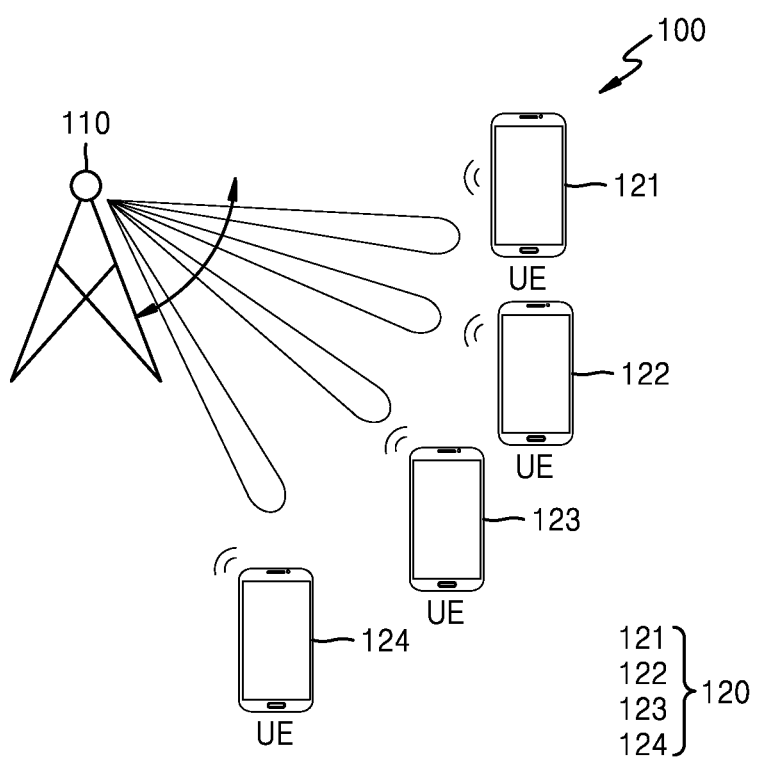
FIG. 1 is a diagram illustrating an example communication system including a plurality of user equipments (UEs), and a base station for providing radio resources to the plurality of UEs, according to various embodiments.

FIG. 1 is a diagram illustrating an example communication system including a plurality of user equipments (UEs), and a base station for providing radio resources to the plurality of UEs, according to various embodiments.

Referring to FIG. 1, a communication system 100 may include a base station 110 and a plurality of UEs 120. According to various embodiments of the disclosure, the base station 110 may include a plurality of cells (not shown), and each of the plurality of UEs 120 may be connected to any one of the plurality of cells. In various embodiments of the disclosure, the base station 110 and the plurality of UEs 120 are not limited to those illustrated in FIG. 1. For example, the communication system 100 may include a plurality of base stations, and each of the plurality of UEs 120 may be connected to any one cell included in any one of the plurality of base stations.

According to an embodiment of the disclosure, each of the plurality of UEs 120 may be connected to any one cell included in the base station 110, and the plurality of UEs 120 illustrated in FIG. 1 may be understood as being connected to different cells. For example, a first UE 121 may be understood as being connected to a first cell, a second UE 122 may be understood as being connected to a second cell, a third UE 123 may be understood as being connected to a third cell, and a fourth UE 124 may be understood as being connected to a fourth cell. According to various embodiments of the disclosure, the number of UEs connected to each cell is not limited to one. For example, although one first UE 121 is connected to the first cell in FIG. 1, the first UE 121 may be understood as including one or more UEs.

According to an embodiment of the disclosure, each of the plurality of UEs 120 may be connected to an active cell. For example, the cell to which each of the plurality of UEs 120 is connected may be understood as an active cell. In an embodiment of the disclosure, any one of the plurality of cells may be in an inactive state. For example, no UE may be connected to the inactive cell. In an embodiment of the disclosure, when at least one UE is connected to an active cell, the active cell may be inactivated by the control of the base station 110 or a server for controlling the base station 110. The at least one UE having been connected to the inactive cell may be controlled to be connected to another active cell other than the inactive cell.

According to an embodiment of the disclosure, states of the plurality of cells may be controlled based on a total load of the plurality of cells. For example, when the total load of the plurality of cells corresponds to a designated first range, some of the plurality of cells corresponding to the first range may be activated, and the other cells may be inactivated. In an embodiment of the disclosure, when the total load of the plurality of cells changes from the designated first range to a designated second range, a state of at least one cell may be changed from an active state to an inactive state or from an inactive state to an active state. In an embodiment of the disclosure, when the state of the at least one cell is changed, at least one UE having been connected to an active cell may be controlled to be connected to another active cell.

A method of controlling states of a plurality of cells for providing radio resources to the plurality of UEs 120, based on a total load of the plurality of cells, and an electronic device for performing the method will be described in greater detail below with reference to the figures.

Figure 2:
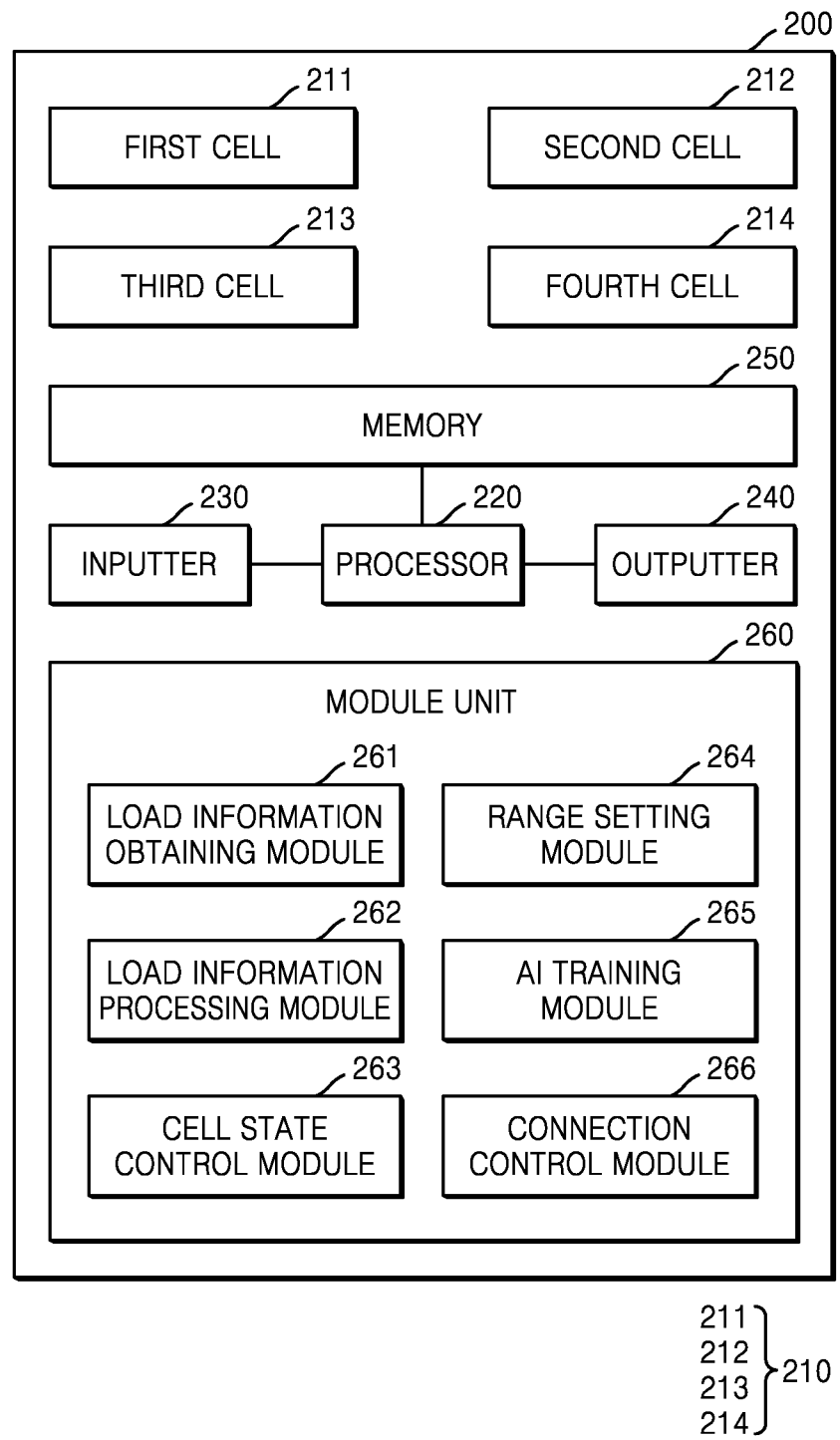
FIG. 2 is a block diagram illustrating an example configuration of an electronic device for controlling a plurality of cells for providing radio resources to a plurality of UEs, according to various embodiments.

FIG. 2 is a block diagram illustrating an example configuration of an electronic device for controlling a plurality of cells for providing radio resources to a plurality of UEs, according to various embodiments.

Referring to FIG. 2, an electronic device 200 may include a plurality of cells 210, e.g., a first cell 211, a second cell 212, a third cell 213, and a fourth cell 214, and further include a processor (e.g., including processing circuitry) 220, an inputter (e.g., including input circuitry) 230, an outputter (e.g., including output circuitry) 240, a memory 250, and a module unit (e.g., including various modules including various circuitry, processing circuitry and/or executable program elements) 260. According to various embodiments of the disclosure, the elements of the electronic device 200 are not limited to those illustrated in FIG. 2, and the electronic device 200 may additionally include elements not illustrated in FIG. 2 or omit some of the elements illustrated in FIG. 2. For example, although the electronic device 200 includes four cells in FIG. 2, the electronic device 200 may include a different number of cells. As another example, although a plurality of operable modules are all included in the module unit 260 in FIG. 2, at least some of the plurality of modules may be implemented as software modules stored in the memory 250. For example, a load information obtaining module 261 may not be implemented as a separate hardware module included in the module unit 260 as illustrated in FIG. 2, but be stored in the memory 250 as a software module and be executed by the processor 220. According to an embodiment of the disclosure, the electronic device 200 may be understood as a device that is the same as or similar to the base station 110 illustrated in FIG. 1.

The plurality of cells 210 may be separately connected to at least some of a plurality of UEs (e.g., the plurality of UEs 120 of FIG. 1) to provide radio resources to the plurality of UEs. In various embodiments of the disclosure, the radio resources may be limited resources shared by a limited number of users at a certain time, and be understood as frequency resources for wireless communication. In an embodiment of the disclosure, the radio resources may refer, for example, and without limitation, to resource blocks (RBs) or physical resource blocks (PRBs) for orthogonal frequency division multiplexing (OFDM) communication.

According to an embodiment of the disclosure, the plurality of cells 210 may provide radio resources corresponding to different frequency bands. For example, and without limitation, the first cell 211 may provide radio resources of a 1.8 GHz band, the second cell 212 may provide radio resources of an 850 MHz band, and the third cell 213 may provide radio resources of a 2.3 GHz band, etc. In an embodiment of the disclosure, the plurality of cells 210 may provide radio resources corresponding to different bandwidths in the same frequency band. For example, and without limitation, the third cell 213 may provide radio resources having a bandwidth of 20 MHz in a 2.3 GHz band, and the fourth cell 214 may provide radio resources having a bandwidth of 10 MHz in the 2.3 GHz band. In various embodiments of the disclosure, the frequency bands for the plurality of cells 210 are not limited to the above-mentioned examples. According to various embodiments of the disclosure, the plurality of cells 210 may have different hardware characteristics to provide radio resources corresponding to different frequency bands or different bandwidths. For example, the plurality of cells 210 may have different power consumption efficiencies. In an embodiment of the disclosure, the power consumption efficiencies may be calculated based on power consumption per RB.

According to an embodiment of the disclosure, each of the plurality of cells 210 may be in an active state or an inactive state. For example, and without limitation, all of the plurality of cells 210 may be in an active state, or at least one cell from among the plurality of cells 210, e.g., the first cell 211, may be in an inactive state and the other cells, e.g., the second, third, and fourth cells 212, 213, and 214, may be in an active state. In an embodiment of the disclosure, at least one cell from among the plurality of cells 210 may be in an active state.

In an embodiment of the disclosure, when at least one cell from among the plurality of cells 210 is in an active state, the at least one active cell may provide radio resources to at least one UE. In an embodiment of the disclosure, when at least one cell from among the plurality of cells 210 is in an inactive state, the at least one inactive cell may not provide radio resources to any UE. According to various embodiments of the disclosure, an active state of the plurality of cells 210 may be understood as a state in which the plurality of cells 210 or power amplifiers included in the plurality of cells 210 are powered on, and an inactive state of the plurality of cells 210 may be understood as a state in which the plurality of cells 210 or the power amplifiers included in the plurality of cells 210 are powered off.

The processor 220 may include various processing circuitry and be electrically connected to the elements included in the electronic device 200, and perform calculation or data processing related to communication and/or control of the elements included in the electronic device 200. According to an embodiment of the disclosure, the processor 220 may load, into the memory 250, commands or data received from at least one of the other elements, process the commands or data, and store resultant data in the memory 250.

The inputter 230 and the outputter 240 may include various circuitry and be electrically connected to the processor 220, and operate as interface elements for transmitting or receiving data to or from another electronic device outside the electronic device 200, e.g., the plurality of UEs 120 illustrated in FIG. 1.

The memory 250 may be electrically connected to the processor 220 and store commands or data related to operations of the elements included in the electronic device 200. According to various embodiments of the disclosure, the memory 250 may store information about a load of each of a plurality of cells, which is obtained using the load information obtaining module 261, a total load calculated using a load information processing module 262, or at least one threshold ratio calculated using a range setting module 264. According to an embodiment of the disclosure, when at least some modules included in the module unit 260 are implemented as software modules to be executed by the processor 220, the memory 250 may store instructions for executing such software modules.

The module unit 260 may include a plurality of modules for implementing a plurality of operations performed in the electronic device 200. According to various embodiments of the disclosure, the module unit 260 may be understood as a piece of hardware for implementing at least some of a plurality of modules illustrated in FIG. 2, or an element conceptually including multiple pieces of hardware for implementing the modules. According to various embodiments of the disclosure, the elements of the module unit 260 are not limited to those illustrated in FIG. 2, and at least some of the plurality of modules included in the module unit 260 illustrated in FIG. 2 may be implemented as software and be stored in the memory 250.

The load information obtaining module 261 may be executed by the processor 220 to obtain, from the plurality of cells 210, information about a load of each of the plurality of cells 210. In an embodiment of the disclosure, the information about the load may be based on PRB usage of each of the plurality of cells 210. The PRB usage may be understood as a ratio of PRBs provided to currently connected UEs to maximum PRBs providable by each of the plurality of cells 210. In an embodiment of the disclosure, the information about the load may be based on at least one of power consumption of each of the plurality of cells 210, the number of UEs connected to each of the plurality of cells 210, or data throughput of each of the plurality of cells 210.

According to an embodiment of the disclosure, the load information obtaining module 261 may obtain information about power consumption efficiency of each of the plurality of cells 210. For example, the load information obtaining module 261 may obtain information about power consumption per RB provided from each of the plurality of cells 210 to UEs. According to an embodiment of the disclosure, the power consumption per RB may differ depending on hardware characteristics of each of the plurality of cells 210. For example, the power consumption per RB of the first cell 211 may be higher than the power consumption per RB of the second cell 212, and the power consumption per RB of the second cell 212 may be higher than the power consumption per RB of the third cell 213 or the fourth cell 214. According to an embodiment of the disclosure, the power consumption per RB may differ depending on a current PRB usage in each cell. For example, the power consumption per RB in each cell may have a value in proportion or inverse proportion to the PRB usage. The power consumption per RB in each cell may have a constant value regardless of the PRB usage.

According to an embodiment of the disclosure, the load information obtaining module 261 may periodically obtain the information about the load of each of the plurality of cells 210 from the plurality of cells 210 at a designated time interval. For example, the designated time interval may be a time corresponding, for example, and without limitation, to one symbol, slot, subframe, half frame, frame, or the like.

The load information processing module 262 may be executed by the processor 220 to process the load information obtained by the load information obtaining module 261, and calculate (determine) various values using the load information. For example, the load information processing module 262 may calculate a total load of the plurality of cells 210 or a maximum total load of the plurality of cells 210, based on the information about the load of each of the plurality of cells 210. In an embodiment of the disclosure, the load information processing module 262 may calculate a ratio of the calculated total load to the maximum total load of the plurality of cells 210. In an embodiment of the disclosure, the ratio of the calculated total load to the maximum total load may be calculated based on the PRB usage. As another example, the load information processing module 262 may calculate a variance between cell loads, based on the information about the load of each of the plurality of cells 210. In an embodiment of the disclosure, the load information processing module 262 may calculate a variance between loads of active cells from among the plurality of cells 210.

A cell state control module 263 may be executed by the processor 220 to control a state of each of the plurality of cells 210. For example, the cell state control module 263 may control a state of at least one cell from among the plurality of cells 210 to an active state by powering on the at least one cell or a power amplifier included in the at least one cell. When the at least one cell is in an active state, the at least one cell may provide radio resources to at least one UE connected thereto, and consume power. As another example, the cell state control module 263 may control a state of at least one cell from among the plurality of cells 210 to an inactive state by powering off the at least one cell or a power amplifier included in the at least one cell. When the at least one cell is in an inactive state, no UE may be connected to the at least one cell and power consumed by the at least one cell may be reduced.

According to an embodiment of the disclosure, the cell state control module 263 may determine a state of each of the plurality of cells 210 to control the state of each of the plurality of cells 210. For example, the cell state control module 263 may determine the state of each of the plurality of cells 210, based on the total load of the plurality of cells 210, which is calculated by the load information processing module 262.

According to an embodiment of the disclosure, the cell state control module 263 may determine the state of each of the plurality of cells 210, based on which of a plurality of ranges the calculated total load corresponds to. In an embodiment of the disclosure, the plurality of ranges may be understood as, for example, and without limitation, ranges set based on the ratio of a total load to the maximum total load of the plurality of cells. For example, a first range may be understood as a range where the ratio of the total load to the maximum total load is greater than or equal to a first threshold ratio, and a second range may be understood as a range where the ratio of the total load to the maximum total load is less than the first threshold ratio and greater than or equal to a second threshold ratio. A third range may be understood as a range where the ratio of the total load to the maximum total load is less than the second threshold ratio and greater than or equal to a third threshold ratio, and a fourth range may be understood as a range where the ratio of the total load to the maximum total load is less than the third threshold ratio. In various embodiments of the disclosure, the threshold ratios for distinguishing between the plurality of ranges may be set by the range setting module 264. According to various embodiments of the disclosure, the number of the plurality of ranges may be set based on the number of the plurality of cells 210. Although four ranges may be described in various embodiments of the disclosure for convenience of explanation, the number of the plurality of ranges is not limited thereto.

According to an embodiment of the disclosure, information indicating whether to activate each of the plurality of cells 210 in each of the plurality of ranges may be set based on power consumption efficiency of each of the plurality of cells 210. For example, in the first range from among the plurality of ranges, the states of all of the plurality of cells 210 may be set to an active state. In an embodiment of the disclosure, in the second range from among the plurality of ranges, the state of the first cell 211 having the lowest power consumption efficiency from among the plurality of cells 210 may be set to an inactive state, and the states of the other cells may be set to an active state. In an embodiment of the disclosure, in the third range from among the plurality of ranges, the states of the first cell 211 and the second cell 212 having the lowest power consumption efficiency from among the plurality of cells 210 other than the first cell 211 may be set to an inactive state, and the states of the other cells may be set to an active state. In an embodiment of the disclosure, in the fourth range from among the plurality of ranges, the states of the first and second cells 211 and 212 and the third cell 213 having the lowest power consumption efficiency from among the plurality of cells 210 other than the first and second cells 211 and 212 may be set to an inactive state, and the state of the fourth cell 214 may be set to an active state.

According to various embodiments of the disclosure, whether to activate each of the plurality of cells 210 may be differently determined based on the plurality of set ranges may be understood that any one cell may be changed from an active state to an inactive state based on a designated order when the calculated total load of the plurality of cells 210 is gradually reduced. For example, when the total load may have the same value as the maximum total load and is gradually reduced over time, the total load may correspond sequentially to the first range, the second range, the third range, and the fourth range. In this case, the cell state control module 263 may change a state of at least one cell from among the plurality of cells 210 from an active state to an inactive state in the order of a cell having the lowest power consumption efficiency, e.g., in the order of the first cell 211, the second cell 212, and the third cell 213. The cell state control module 263 may maintain a state of a cell having the highest power consumption efficiency, e.g., the fourth cell 214, to an active state even when the total load is reduced to 0.

According to various embodiments of the disclosure, whether to activate each of the plurality of cells 210 may be differently determined based on the plurality of set ranges may be understood that any one cell may be changed from an inactive state to an active state based on a designated order when the calculated total load of the plurality of cells 210 is gradually increased. For example, when the total load may have a value of 0 and is gradually increased over time, the total load may correspond sequentially to the fourth range, the third range, the second range, and the first range. In this case, the cell state control module 263 may maintain a state of a cell having the highest power consumption efficiency, e.g., the fourth cell 214, to an active state, and change a state of at least one cell from among the plurality of cells 210 from an inactive state to an active state in the order of a cell having the highest power consumption efficiency from among the plurality of cells 210 other than the fourth cell 214, e.g., in the order of the third cell 213, the second cell 212, and the first cell 211.

According to an embodiment of the disclosure, the cell state control module 263 may determine which of the plurality of ranges the total load of the plurality of cells 210, which is calculated by the load information processing module 262, corresponds to, and control the state of each of the plurality of cells 210, based on the information indicating whether to activate each of the plurality of cells 210 in the determined range.

The range setting module 264 may be executed by the processor 220 to set threshold ratio values for distinguishing between the plurality of ranges for determining the states of the plurality of cells 210. In an embodiment of the disclosure, the range setting module 264 may set the threshold ratio values using an artificial intelligence (AI) model. In an embodiment of the disclosure, the AI model may be trained by an AI training module 265 to calculate appropriate threshold ratio values based on information related to the state of each of the plurality of cells 210 or information related to a current network state. In various embodiments of the disclosure, the information related to the state of each of the plurality of cells 210 may include at least one of the information indicating whether to activate each of the plurality of cells 210, the power consumption of each of the plurality of cells 210, or the PRB usage of each of the plurality of cells 210. In various embodiments of the disclosure, the information related to the network state may include, for example, and without limitation, at least one of downlink (DL) data throughput, the number of connected UEs, or network delay.

According to an embodiment of the disclosure, a threshold ratio value for each of the plurality of ranges may be understood as a threshold ratio at which each of the plurality of cells 210 is changed from an active state to an inactive state or from an inactive state to an active state. For example, the first threshold ratio for distinguishing between the first and second ranges may be understood as a threshold ratio at which the state of the first cell 211 having the lowest power consumption efficiency is changed. As another example, the second threshold ratio for distinguishing between the second and third ranges may be understood as a threshold ratio at which the state of the second cell 212 having the lowest power consumption efficiency from among the plurality of cells 210 other than the first cell 211 is changed. As still another example, the third threshold ratio for distinguishing between the third and fourth ranges may be understood as a threshold ratio at which the state of the third cell 213 having the lowest power consumption efficiency from among the plurality of cells 210 other than the first and second cells 211 and 212 is changed. In various embodiments of the disclosure, each of the threshold ratio values for distinguishing between the plurality of ranges may be understood as a threshold ratio value for each of the plurality of cells 210.

According to an embodiment of the disclosure, the range setting module 264 may periodically update the threshold ratio values using the AI model at a designated time interval. For example, the range setting module 264 may update the threshold ratio values using the AI model at a specific time or on a specific day, or when a specific event, e.g., a gathering or a ceremony, occurs.

The AI training module 265 may be executed by the processor 220 to train the AI model for setting the ranges. For example, the AI training module 265 may train the AI model based on the information related to the states of the plurality of cells 210 or the information related to the network state to calculate appropriate threshold ratio values capable of improving or at least maintaining the network state and of reducing total power consumption of the plurality of cells 210.

According to an embodiment of the disclosure, the AI model may use, as an input, at least one of the information about the load of each of the plurality of cells 210, the total load of the plurality of cells 210, the maximum total load of the plurality of cells 210, the state of each of the plurality of cells 210, the power consumption efficiency of each of the plurality of cells 210, or a network performance indicator of the plurality of cells 210 (e.g., a key performance indicator (KPI) of a mobile carrier).

According to an embodiment of the disclosure, the AI model may, for example, be trained through reinforcement learning. For example, the AI model may use the total load of the plurality of cells 210 (e.g., total PRB usage of the plurality of cells 210), the state of each of the plurality of cells 210 (e.g., the information indicating whether to activate each of the plurality of cells 210), the power consumption of each of the plurality of cells 210, or the network performance indicator of the plurality of cells 210 as a state variable of reinforcement learning. The AI model may use each of the threshold ratio values for the plurality of cells 210 as an action variable, and use the power consumption or the network performance indicator as a reward variable based on the action variable.

According to an embodiment of the disclosure, the reward variable may be increased when the power consumption is reduced, and be reduced when the network performance indicator is reduced. In an embodiment of the disclosure, an increase or decrease in the reward variable based on the change in the power consumption or the network performance indicator may be calculated by applying different weights to the power consumption and the network performance indicator. In various embodiments of the disclosure, the weight for the power consumption may be higher than the weight for the network performance indicator when priority is given to reduction in the power consumption compared to the network performance indicator, or the weight for the network performance indicator may be higher than the weight for the power consumption when priority is given to the network performance indicator compared to reduction in the power consumption. In various embodiments of the disclosure, the AI training module 265 may calculate threshold ratio values of the plurality of cells 210, the threshold ratio values being capable of maximizing the value of the reward variable.

A connection control module 266 may be executed by the processor 220 to control the plurality of cells 210 in such a manner that at least one UE is connected to the plurality of cells 210. For example, the connection control module 266 may control active cells from among the plurality of cells 210 in such a manner that at least one UE is connected to any one of the active cells. According to various embodiments of the disclosure, the connection control module 266 may control the plurality of cells 210 in such a manner that a plurality of UEs are reassigned and connected to the active cells in response to the change in the state of the at least one cell. For example, when the state of the at least one cell is changed from an active state to an inactive state, the connection control module 266 may control the plurality of cells 210 in such a manner that at least one UE having been connected to the at least one cell is connected to another active cell. As another example, when the state of the at least one cell is changed from an inactive state to an active state, the connection control module 266 may control the plurality of cells 210 in such a manner that at least one UE from among a plurality of UEs having been connected to cells other than the at least one cell is connected to the at least one cell.

According to an embodiment of the disclosure, the connection control module 266 may control the plurality of cells 210 in such a manner that the plurality of UEs are reassigned and connected to the active cells, in consideration of the total power consumption of the plurality of cells 210. For example, when the state of the at least one cell is changed from an active state to an inactive state, the connection control module 266 may control the plurality of cells 210 in such a manner that at least one UE having been connected to the at least one cell may be preferentially connected to a cell having the lowest power consumption per RB from among the active cells. The cell having the lowest power consumption per RB may be understood as a cell having the highest power consumption efficiency.

According to an embodiment of the disclosure, the connection control module 266 may control the plurality of cells 210 in such a manner that the plurality of UEs are reassigned and connected to the active cells, in consideration of the total power consumption of the plurality of cells 210 and load balancing between the plurality of cells 210. For example, when the state of the at least one cell is changed from an active state to an inactive state, the connection control module 266 may determine whether the variance between the loads of the active cells, which is calculated by the load information processing module 262, is greater than or equal to a threshold value. In an embodiment of the disclosure, when the variance is greater than or equal to the threshold value, load balancing between the active cells may not be appropriately achieved and thus the connection control module 266 may control the plurality of cells 210 in such a manner that at least one UE having been connected to the at least one cell is preferentially connected to a cell having the lowest load from among the active cells. In an embodiment of the disclosure, when the variance is less than the threshold value, load balancing between the active cells may be appropriately achieved and thus the connection control module 266 may control the plurality of cells 210 in such a manner that at least one UE having been connected to the at least one cell is preferentially connected to a cell having the lowest power consumption per RB from among the active cells, in order to reduce power consumption.

According to various embodiments of the disclosure, the connection control module 266 may determine a cell to which each of one or more UEs having been connected to the cell whose state is changed is to be connected, in consideration of the total power consumption of the plurality of cells 210 and/or load balancing between the plurality of cells 210. For example, when a first UE and a second UE have been connected to a cell whose state is changed from an active state to an inactive state, the connection control module 266 may reassign the first UE to an active cell, and then redetermine whether the variance between the loads of the active cells, which is calculated by the load information processing module 262, is greater than or equal to the threshold value. The connection control module 266 may reassign the second UE to an active cell, based on the determination. The first and second UEs may be reassigned to the same cell or different cells.

Figure 3:
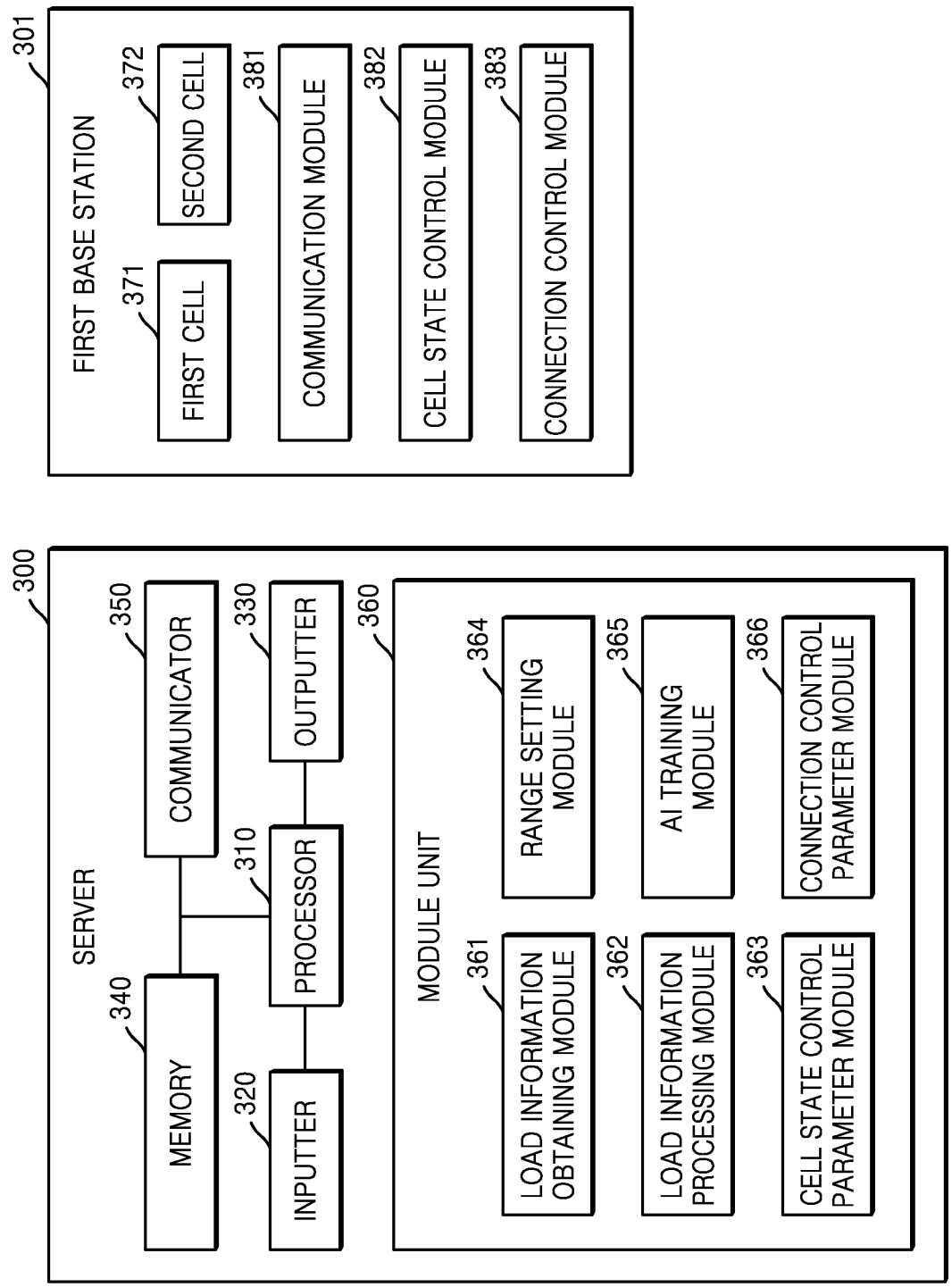
FIG. 3 is a block diagram illustrating an example configuration of a server and base station for controlling a plurality of cells for providing radio resources to a plurality of UEs, according to various embodiments.

FIG. 3 is a block diagram illustrating an example configuration of a server and base station for controlling a plurality of cells for providing radio resources to a plurality of UEs, according to various embodiments.

Referring to FIG. 3, a server 300 may communicate with one or more base stations, e.g., a first base station 301, and control a plurality of cells, e.g., a first cell 371 and a second cell 372, included in the first base station 301. According to various embodiments of the disclosure, the base stations communicating with the server 300 are not limited to the first base station 301 illustrated in FIG. 3, and may further include one or more other base stations (not shown), and the plurality of cells controlled by the server 300 are not limited to the first and second cells 371 and 372 included in the first base station 301 illustrated in FIG. 3. For example, the server 300 may further control one or more cells, e.g., a third cell (not shown) and a fourth cell (not shown), included in the one or more other base stations (not shown), e.g., a second base station (not shown). In relation to FIG. 3, a description of the first base station 301 or elements included in the first base station 301 may be equally or similarly applied to the one or more other base stations (not shown).

According to an embodiment of the disclosure, the server 300 may include a processor (e.g., including processing circuitry) 310, an inputter (e.g., including input circuitry) 320, an outputter (e.g., including output circuitry) 330, a memory 340, a communicator (e.g., including communication circuitry) 350, and a module unit (e.g., including at least one module including various circuitry, processing circuitry and/or executable program elements) 360. According to various embodiments of the disclosure, the elements of the server 300 are not limited to those illustrated in FIG. 3, and the server 300 may additionally include elements not illustrated in FIG. 3 or omit some of the elements illustrated in FIG. 3. For example, although a plurality of operable modules are all included in the module unit 360 in FIG. 3, at least some of the plurality of modules may be implemented as software modules stored in the memory 340.

According to various embodiments of the disclosure, the description provided above in relation to FIG. 2 may be equally or similarly applied to some of the elements of the server 300 illustrated in FIG. 3, which are the same as or similar to the elements of the electronic device 200 illustrated in FIG. 2. For example, the description of the load information obtaining module 261, the load information processing module 262, the range setting module 264, or the AI training module 265 included in the module unit 260 of the electronic device 200 illustrated in FIG. 2 may be equally or similarly applied to a load information obtaining module 361, a load information processing module 362, a range setting module 364, or an AI training module 365 included in the module unit 360.

According to an embodiment of the disclosure, the processor 310 may include various processing circuitry and be electrically connected to the elements included in the server 300, and perform calculation or data processing related to communication and/or control of the elements included in the server 300. According to an embodiment of the disclosure, the processor 310 may load, into the memory 340, commands or data received from at least one of the other elements, process the commands or data, and store resultant data in the memory 340. According to an embodiment of the disclosure, the inputter 320 and the outputter 330 may include various circuitry and be electrically connected to the processor 310, and be interface elements for transmitting or receiving data to or from another electronic device outside the server 300, e.g., the first base station 301 or the one or more other base stations (not shown). According to an embodiment of the disclosure, the memory 340 may be electrically connected to the processor 310 and store commands or data related to operations of the elements included in the server 300. According to an embodiment of the disclosure, when at least some modules included in the module unit 360 are implemented as software modules to be executed by the processor 310, the memory 340 may store instructions for executing such software modules.

According to an embodiment of the disclosure, the communicator 350 may include various communication circuitry and establish a wired or wireless communication channel and support communication through the established communication channel between the server 300 and another electronic device outside the server 300, e.g., the first base station 301 or the one or more other base stations (not shown). According to an embodiment of the disclosure, the communicator 350 may receive or transmit data from or to the other electronic device through wired or wireless communication. For example, the communicator 350 may receive information about a load of each of the first and second cells 371 and 372 from the first base station 301 and transmit a cell state control parameter or a connection control parameter to the first base station 301 through wired or wireless communication.

According to an embodiment of the disclosure, the module unit 360 may include a plurality of modules for implementing a plurality of operations performed in the server 300. According to various embodiments of the disclosure, the module unit 360 may be understood as a piece of hardware for implementing at least some of a plurality of modules illustrated in FIG. 3, or an element conceptually including multiple pieces of hardware for implementing the modules. According to various embodiments of the disclosure, the elements of the module unit 360 are not limited to those illustrated in FIG. 3, and at least some of the plurality of modules included in the module unit 360 illustrated in FIG. 3 may be implemented as software and be stored in the memory 340.

According to an embodiment of the disclosure, the load information obtaining module 361 may be executed by the processor 310 to obtain information about a load of each of the plurality of cells included in the base stations, e.g., the first and second cells 371 and 372 included in the first base station 301. According to an embodiment of the disclosure, the load information obtaining module 361 may obtain information about power consumption efficiency of each of the first and second cells 371 and 372. According to an embodiment of the disclosure, the load information obtaining module 361 may periodically obtain the information about the load of each of the first and second cells 371 and 372 at a designated time interval. In various embodiments of the disclosure, the above description of the load information obtaining module 261 illustrated in FIG. 2 may be equally or similarly applied to the load information obtaining module 361.

According to an embodiment of the disclosure, the load information processing module 362 may be executed by the processor 310 to process the load information obtained by the load information obtaining module 361, and calculate various values using the load information. For example, the load information processing module 362 may calculate a total load of the plurality of cells included in the base stations, e.g., the first and second cells 371 and 372 included in the first base station 301, based on the information about the load of each of the plurality of cells included in the base stations, e.g., the first and second cells 371 and 372 included in the first base station 301. As another example, the load information processing module 362 may calculate a maximum total load of the plurality of cells included in the base stations, e.g., the first and second cells 371 and 372 included in the first base station 301. In an embodiment of the disclosure, the load information processing module 362 may calculate a ratio of the calculated total load to the maximum total load, or calculate a variance between at least some of the plurality of cells included in the base stations, e.g., the first and second cells 371 and 372. In various embodiments of the disclosure, the above description of the load information processing module 262 illustrated in FIG. 2 may be equally or similarly applied to the load information processing module 362.

According to an embodiment of the disclosure, a cell state control parameter module 363 may be executed by the processor 310 to calculate a parameter for controlling states of the plurality of cells included in the base stations, e.g., the first and second cells 371 and 372 included in the first base station 301. For example, the cell state control parameter module 363 may determine a states of the first and second cells 371 and 372, based on the total load of the plurality of cells, e.g., the first and second cells 371 and 372, which is calculated by the load information processing module 362, and calculate a cell state control parameter value to control the first and second cells 371 and 372 to the determined states.

According to an embodiment of the disclosure, the cell state control parameter module 363 may determine the state of each of the plurality of cells, e.g., the first and second cells 371 and 372, based on which of a plurality of ranges the total load of the plurality of cells corresponds to, and calculate a cell state control parameter value corresponding thereto. In various embodiments of the disclosure, the description provided above in relation to FIG. 2 may be equally or similarly applied to the plurality of ranges.

In various embodiments of the disclosure, threshold ratios for distinguishing between the plurality of ranges may be set by the range setting module 364. According to various embodiments of the disclosure, the number of ranges included in the plurality of ranges may be set based on a total number of the plurality of cells, e.g., the plurality of cells included in the base stations controlled by the server 300.

According to an embodiment of the disclosure, information indicating whether to activate each of the plurality of cells, e.g., the first and second cells 371 and 372, in each of the plurality of ranges may be set based on power consumption efficiency of each of the plurality of cells. In an embodiment of the disclosure, when the server 300 controls the first base station 301 and the second base station (not shown), the plurality of cells may include the first and second cells 371 and 372 included in the first base station 301 and the third and fourth cells (not shown) included in the second base station. The information indicating whether to activate each of the first cell 371, the second cell 372, the third cell, and the fourth cell may be differently determined in each of the plurality of ranges, based on the power consumption efficiency of each of the first cell 371, the second cell 372, the third cell, and the fourth cell.

For example, in a first range where the ratio of the total load to the maximum total load is greater than or equal to a first threshold ratio, the states of all of the first cell 371, the second cell 372, the third cell, and the fourth cell may be set to an active state. As another example, in a second range where the ratio of the total load to the maximum total load is less than the first threshold ratio and greater than or equal to a second threshold ratio, the state of the first cell 371 having the lowest power consumption efficiency may be set to an inactive state, and the states of the second cell 372, the third cell, and the fourth cell may be set to an active state. As another example, in a third range where the ratio of the total load to the maximum total load is less than the second threshold ratio and greater than or equal to a third threshold ratio, the states of the first cell 371 and the second cell 372 having relatively low power consumption efficiencies may be set to an inactive state, and the states of the third cell and the fourth cell may be set to an active state. As still another example, in a fourth range where the ratio of the total load to the maximum total load is less than the third threshold ratio, the states of the first cell 371, the second cell 372, and the third cell having relatively low power consumption efficiencies may be set to an inactive state, and the state of the fourth cell may be set to an active state.

According to an embodiment of the disclosure, the range setting module 364 may be executed by the processor 310 to set threshold ratio values for distinguishing between the plurality of ranges for determining the states of the plurality of cells, e.g., the first and second cells 371 and 372. In an embodiment of the disclosure, the range setting module 364 may set the threshold ratio values using an AI model. In an embodiment of the disclosure, the AI model may be trained by the AI training module 365 to calculate appropriate threshold ratio values based on information related to the state of each of the plurality of cells or information related to a current network state.

According to an embodiment of the disclosure, the range setting module 364 may periodically update the threshold ratio values using the AI model at a designated time interval. For example, the range setting module 364 may update the threshold ratio values using the AI model at a specific time or on a specific day, or when a specific event, e.g., a gathering or a ceremony, occurs. In various embodiments of the disclosure, the above description of the range setting module 264 illustrated in FIG. 2 may be equally or similarly applied to the range setting module 364.

According to an embodiment of the disclosure, the AI training module 365 may be executed by the processor 310 to train the AI model for setting the ranges. For example, the AI training module 365 may train the AI model based on the information related to the states of the plurality of cells, e.g., the first and second cells 371 and 372, or the information related to the network state to calculate appropriate threshold ratio values capable of improving or at least maintaining the network state and of reducing total power consumption of the plurality of cells 310. In various embodiments of the disclosure, the above description of the AI training module 265 illustrated in FIG. 2 may be equally or similarly applied to the AI training module 365.

According to an embodiment of the disclosure, a connection control parameter module 366 may be executed by the processor 310 to calculate a connection control parameter value for controlling the plurality of cells, e.g., the first and second cells 371 and 372, in such a manner that at least one UE is connected to the plurality of cells. For example, the connection control parameter module 366 may transmit the connection control parameter to a base station including active cells, e.g., the first base station 301, in such a manner that at least one UE is connected to any one of the active cells from among the plurality of cells. In an embodiment of the disclosure, the connection control parameter module 366 may transmit the connection control parameter to each of a plurality of base stations controlled by the server 300. For example, the connection control parameter module 366 may transmit a first connection control parameter to the first base station 301 in such a manner that at least one UE is connected to any one of the plurality of cells included in the first base station 301, and transmit a second connection control parameter to the second base station (not shown) in such a manner that at least one UE is connected to any one of the plurality of cells included in the second base station.

According to various embodiments of the disclosure, the connection control parameter module 366 may calculate a connection control parameter value for controlling the plurality of cells in such a manner that a plurality of UEs are reassigned and connected to the active cells in response to the change in the state of the at least one cell. For example, when the state of the at least one cell is changed from an active state to an inactive state, the connection control parameter module 366 may calculate the connection control parameter value in such a manner that at least one UE having been connected to the at least one cell is connected to another active cell. As another example, when the state of the at least one cell is changed from an inactive state to an active state, the connection control parameter module 366 may calculate the connection control parameter value in such a manner that at least one UE from among a plurality of UEs having been connected to cells other than the at least one cell is connected to the at least one cell.

According to an embodiment of the disclosure, the connection control parameter module 366 may calculate the connection control parameter value in such a manner that the plurality of UEs are reassigned and connected to the active cells, in consideration of the total power consumption of the plurality of cells, e.g., the first and second cells 371 and 372. For example, when the state of the at least one cell is changed from an active state to an inactive state, the connection control parameter module 366 may calculate the connection control parameter value in such a manner that at least one UE having been connected to the at least one cell is preferentially connected to a cell having the lowest power consumption per RB from among the active cells included in the one or more base stations.

According to an embodiment of the disclosure, the connection control parameter module 366 may calculate the connection control parameter value in such a manner that the plurality of UEs are reassigned and connected to the active cells included in the one or more base stations, in consideration of the total power consumption of the plurality of cells, e.g., the first and second cells 371 and 372, and load balancing between the plurality of cells. For example, when the state of the at least one cell is changed from an active state to an inactive state, the connection control parameter module 366 may determine whether the variance between the loads of the active cells, which is calculated by the load information processing module 362, is greater than or equal to a threshold value. In an embodiment of the disclosure, when the variance is greater than or equal to the threshold value, load balancing between the active cells may not be appropriately achieved and thus the connection control parameter module 366 may calculate the connection control parameter value in such a manner that at least one UE having been connected to the at least one cell is preferentially connected to a cell having the lowest load from among the active cells. In an embodiment of the disclosure, when the variance is less than the threshold value, load balancing between the active cells may be appropriately achieved and thus the connection control parameter module 366 may calculate the connection control parameter value in such a manner that at least one UE having been connected to the at least one cell is preferentially connected to a cell having the lowest power consumption per RB from among the active cells, in order to reduce power consumption.

According to various embodiments of the disclosure, the connection control parameter module 366 may determine a cell to which each of one or more UEs having been connected to the cell whose state is changed is to be connected, in consideration of the total power consumption of the plurality of cells, e.g., the first and second cells 371 and 372, and/or load balancing between the plurality of cells. For example, when a first UE and a second UE have been connected to a cell whose state is changed from an active state to an inactive state, the connection control parameter module 366 may transmit a connection control parameter value to the base station, e.g., the first base station 301, to reassign the first UE to an active cell, and then redetermine whether the variance between the loads of the active cells, which is calculated by the load information processing module 362, is greater than or equal to the threshold value. The connection control parameter module 366 may transmit another connection control parameter value to reassign the second UE to an active cell, based on the determination. The first and second UEs may be reassigned to the same cell or different cells.

The first base station 301 may include a plurality of cells, e.g., the first and second cells 371 and 372, and provide radio resources to a plurality of UEs using the first and second cells 371 and 372. According to an embodiment of the disclosure, the first base station 301 may communicate with the server 300 to transmit the information about the load of each of the first and second cells 371 and 372 to the server 300 and receive the cell state control parameter or the connection control parameter from the server 300.

According to an embodiment of the disclosure, the first base station 301 may include the first cell 371, the second cell 372, a communication module (e.g., including communication circuitry) 381, a cell state control module (e.g., including various circuitry, processing circuitry and/or executable program elements) 382, and a connection control module (e.g., including various circuitry, processing circuitry and/or executable program elements) 383. In various embodiments of the disclosure, the elements of the first base station 301 are not limited to those illustrated in FIG. 3, and the first base station 301 may additionally include elements not illustrated in FIG. 3 or omit some of the elements illustrated in FIG. 3. For example, the first base station 301 may further include one or more cells.

According to an embodiment of the disclosure, the communication module 381 may include various communication circuitry and establish a wired or wireless communication channel and support communication through the established communication channel between the first base station 301 and another electronic device outside the first base station 301, e.g., the server 300. According to an embodiment of the disclosure, the communication module 381 may receive or transmit data from or to the server 300 through wired or wireless communication.

According to an embodiment of the disclosure, the cell state control module 382 may control a state of each of the first and second cells 371 and 372 included in the first base station 301, based on the cell state control parameter. For example, the cell state control module 382 may control a state of at least one cell from among the first and second cells 371 and 372 to an active state by powering on the at least one cell or a power amplifier included in the at least one cell. As another example, the cell state control module 382 may control a state of at least one cell from among the first and second cells 371 and 372 to an inactive state by powering off the at least one cell or a power amplifier included in the at least one cell. In various embodiments of the disclosure, the cell state control parameter may be updated from the server 300.

According to an embodiment of the disclosure, the connection control module 383 may control the first and second cells 371 and 372 included in the first base station 301 in such a manner that at least one UE is connected to or disconnected from at least one cell from among the first and second cells 371 and 372, based on the connection control parameter. For example, the connection control module 383 may control active cells from among the first and second cells 371 and 372 in such a manner that at least one UE is connected to any one of the active cells. In various embodiments of the disclosure, the connection control parameter may be updated from the server 300.

Figure 4:
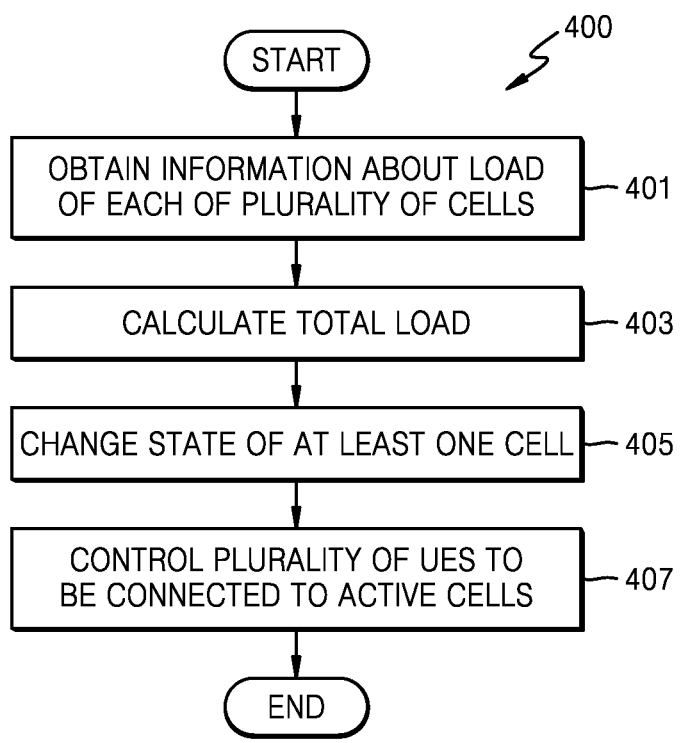
FIG. 4 is a flowchart illustrating an example method of controlling a plurality of cells for providing radio resources to a plurality of UEs, according to various embodiments.

FIG. 4 is a flowchart illustrating an example method of controlling a plurality of cells for providing radio resources to a plurality of UEs, according to various embodiments.

Referring to FIG. 4, a method 400, performed by an electronic device, of controlling a plurality of cells for providing radio resources to a plurality of UEs may include operations 401, 403, 405 and 407. According to various embodiments of the disclosure, the method 400 is not limited to that illustrated in FIG. 4. For example, the method 400 may further include operations not illustrated in FIG. 4, or omit at least some of the operations illustrated in FIG. 4. In various embodiments of the disclosure, operations 401 to 407 may be understood as being performed by the electronic device 200 of FIG. 2 or the server 300 of FIG. 3.

In operation 401, the electronic device may obtain information about a load of each of a plurality of cells. In various embodiments of the disclosure, the plurality of cells includes elements for providing radio resources to at least one UE, and may be included in the electronic device or be provided outside the electronic device. In an embodiment of the disclosure, the information about the load may be based on PRB usage of each of the plurality of cells.

In operation 403, the electronic device may calculate a total load of the plurality of cells, based on the information about the load of each of the plurality of cells, which is obtained in operation 401. For example, the total load may be calculated as a sum of the PRB usages of the plurality of cells.

In operation 405, the electronic device may change a state of at least one cell from among the plurality of cells, based on the total load calculated in operation 403. For example, the electronic device may calculate a ratio of the calculated total load to a maximum total load of the plurality of cells, and change the state of the at least one cell from an active state to an inactive state or from an inactive state to an active state, based on the ratio. In various embodiments of the disclosure, the electronic device may determine which of a plurality of ranges the calculated ratio corresponds to, and determine whether to activate the at least one cell, based on the determined range. According to various embodiments of the disclosure, the electronic device may determine a cell whose state is to be changed from among the plurality of cells, based on power consumption efficiencies of the plurality of cells.

In operation 407, the electronic device may control a plurality of UEs to be connected to active cells. For example, when the state of the at least one cell is changed from an active state to an inactive state in operation 405, the electronic device may control the plurality of cells in such a manner that one or more UEs having been connected to the cell whose state is changed are connected to other active cells. As another example, when the state of the at least one cell is changed from an inactive state to an active state in operation 405, the electronic device may control the plurality of cells in such a manner that one or more UEs having been connected to active cells before the state is changed are connected to the cell whose state is changed to an active state.

Through operations 401, 403, 405 and 407, the electronic device may determine a state of each of the plurality of cells based on the total load of the plurality of cells and thus reduce total power consumption of the plurality of cells and prevent concentration of load on a specific cell.

Figure 5:
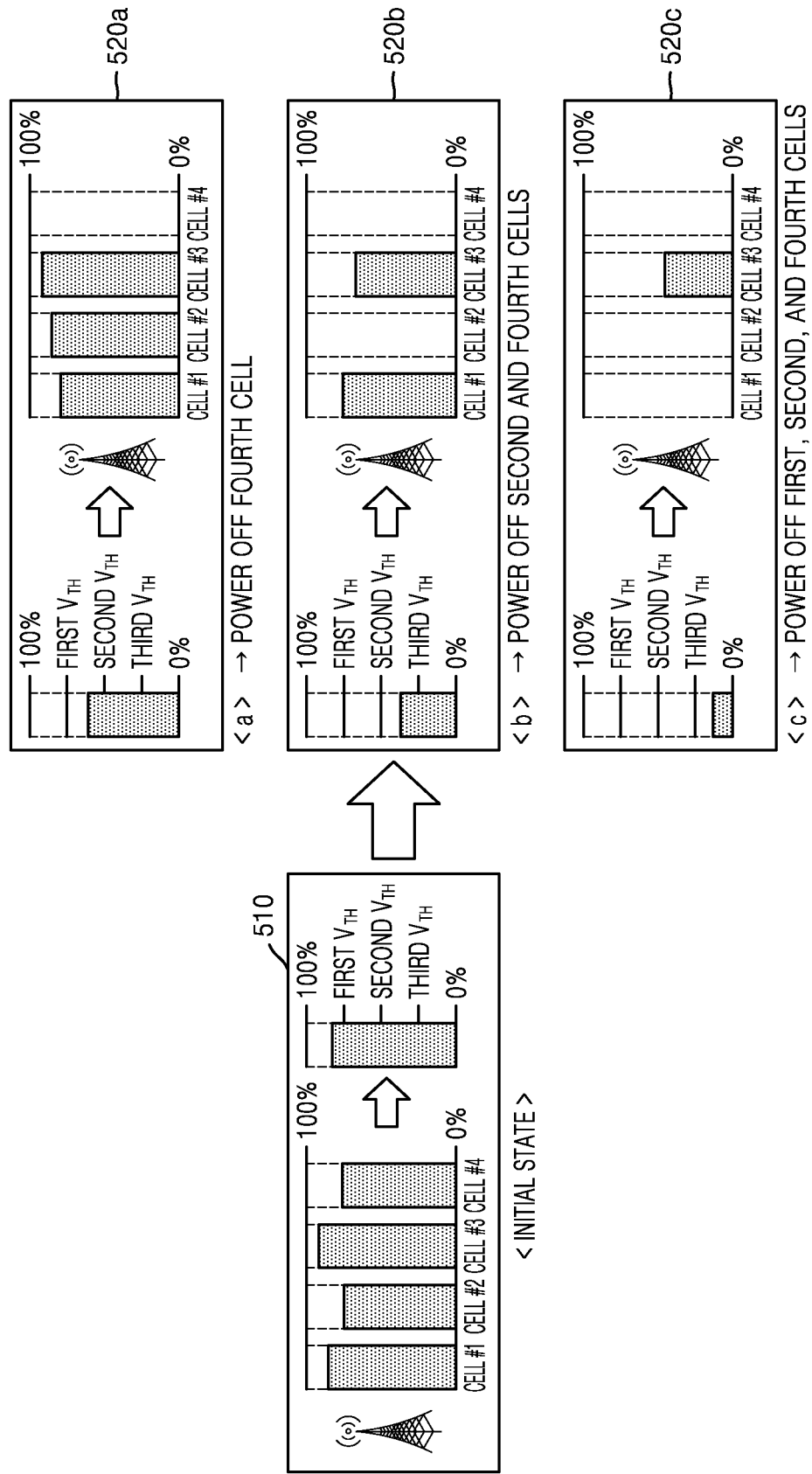
FIG. 5 is a diagram illustrating an example method of controlling states of a plurality of cells when a total load is reduced, according to various embodiments.

FIG. 5 is a diagram illustrating an example method of controlling states of a plurality of cells when a total load is reduced, according to various embodiments.

Referring to FIG. 5, first, second, third, and fourth graphs 510, 520a, 520b, and 520c are illustrated. The first graph 510 shows a load of each of a plurality of cells, e.g., first to fourth cells, and a total load of the plurality of cells in an initial state, and the second to fourth graphs 520a, 520b and 520c show the load of each of the plurality of cells and the total load of the plurality of cells after time has passed from the initial state. In an embodiment of the disclosure, the initial state may be understood as a state at a reference timing. In relation to FIG. 5, it may be assumed that power consumption efficiencies of the plurality of cells are reduced in the order of the third cell, the first cell, the second cell, and the fourth cell, and a description may be provided based on the order of the power consumption efficiencies.

Referring to the first graph 510, it is shown that the total load of the plurality of cells, e.g., the first to fourth cells, corresponds to a first range greater than or equal to a first threshold value, and that all of the plurality of cells are in an active state.

Referring to the second graph 520a, in an embodiment of the disclosure, the total load of the plurality of cells may be reduced over time. For example, as shown in the second graph 520a, the total load of the plurality of cells may correspond to a second range less than the first threshold value and greater than or equal to a second threshold value. According to an embodiment of the disclosure, when the total load corresponds to the second range, the state of the fourth cell having the lowest power consumption efficiency from among the plurality of cells may be changed from an active state to an inactive state. In an embodiment of the disclosure, at least one UE having been connected to the fourth cell may be connected to any one cell from among the first to third cells. For example, the at least one UE having been connected to the fourth cell may be connected to the third cell having the highest power consumption efficiency. As another example, the at least one UE having been connected to the fourth cell may be connected to the first cell having the lowest load, in consideration of load balancing.

Referring to the third graph 520b, in an embodiment of the disclosure, the total load of the plurality of cells may be reduced over time. For example, as shown in the third graph 520b, the total load of the plurality of cells may correspond to a third range less than the second threshold value and greater than or equal to a third threshold value. According to an embodiment of the disclosure, when the total load corresponds to the third range, the states of the fourth and second cells having the lowest power consumption efficiencies from among the plurality of cells may be changed from an active state to an inactive state. In an embodiment of the disclosure, at least one UE having been connected to the fourth or second cell may be connected to any one cell from among the first and third cells. For example, the at least one UE having been connected to the fourth cell may be connected to the third cell having the highest power consumption efficiency. As another example, the at least one UE having been connected to the second cell may be connected to the third cell having the lowest load, in consideration of load balancing.

Referring to the fourth graph 520c, in an embodiment of the disclosure, the total load of the plurality of cells may be reduced over time. For example, as shown in the fourth graph 520c, the total load of the plurality of cells may correspond to a fourth range less than the third threshold value. According to an embodiment of the disclosure, when the total load corresponds to the fourth range, the states of the first, second, and fourth cells other than the third cell having the highest power consumption efficiency from among the plurality of cells may be changed from an active state to an inactive state. In an embodiment of the disclosure, at least one UE having been connected to the first, second, or fourth cell may be connected to the third cell.

Figure 6:
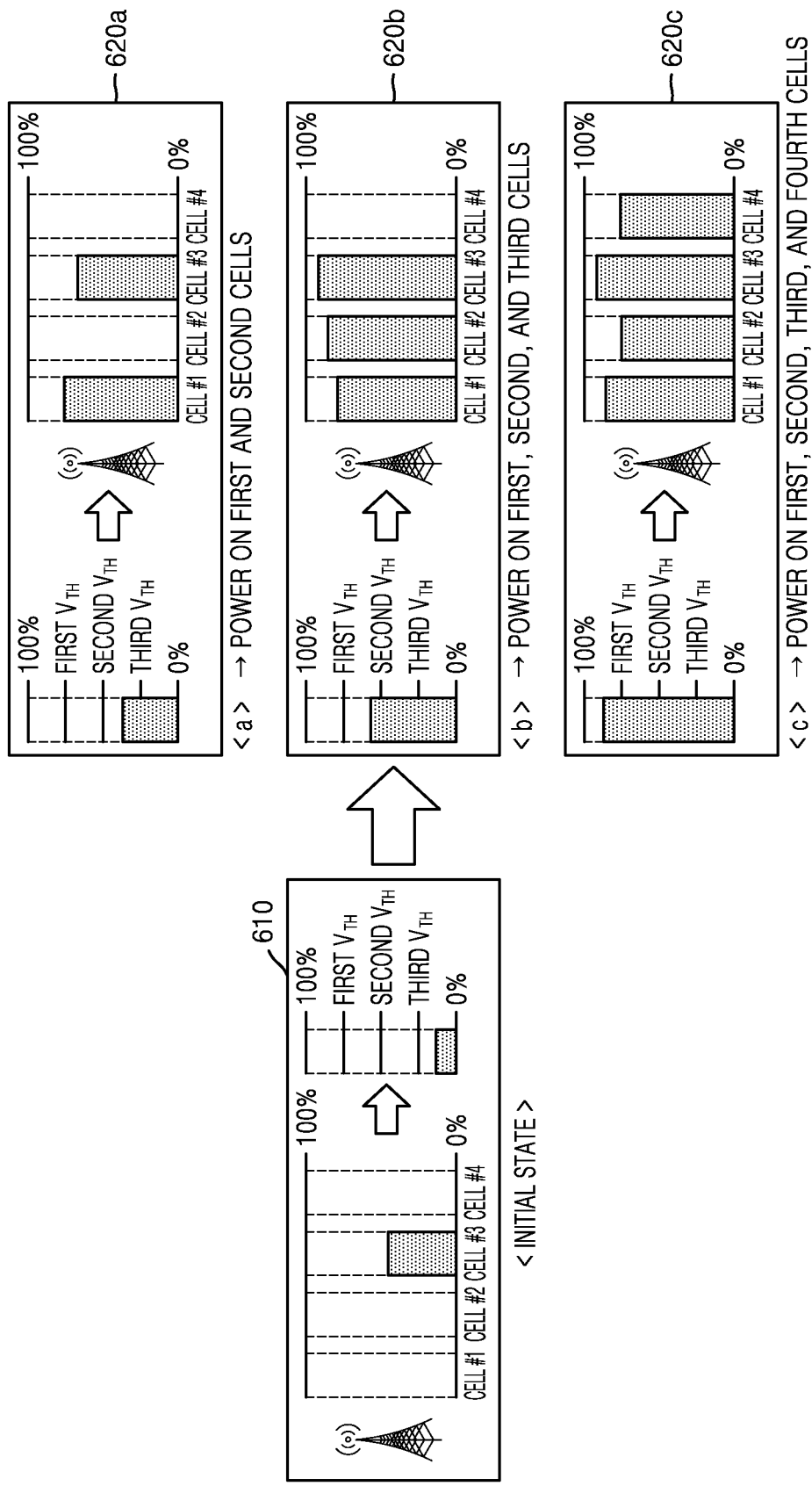
FIG. 6 is a diagram illustrating an example method of controlling states of a plurality of cells when a total load is increased, according to various embodiments.

FIG. 6 is a diagram illustrating an example method of controlling states of a plurality of cells when a total load is increased, according to various embodiments.

Referring to FIG. 6, first, second, third, and fourth graphs 610, 620a, 620b, and 620c are illustrated. The first graph 610 shows a load of each of a plurality of cells, e.g., first to fourth cells, and a total load of the plurality of cells in an initial state, and the second to fourth graphs 620a to 620c show the load of each of the plurality of cells and the total load of the plurality of cells after time has passed from the initial state. In an embodiment of the disclosure, the initial state may be understood as a state at a reference timing. In relation to FIG. 6, it may be assumed that power consumption efficiencies of the plurality of cells are reduced in the order of the third cell, the first cell, the second cell, and the fourth cell, and a description may be provided based on the order of the power consumption efficiencies.

Referring to the first graph 610, it is shown that the total load of the plurality of cells, e.g., the first to fourth cells, corresponds to a fourth range less than a third threshold value, and that all of the first, second, and fourth cells other than the third cell having the highest power consumption efficiency from among the plurality of cells are in an inactive state.

Referring to the second graph 620a, in an embodiment of the disclosure, the total load of the plurality of cells may be increased over time. For example, as shown in the second graph 620a, the total load of the plurality of cells may correspond to a third range greater than or equal to the third threshold value and less than a second threshold value. According to an embodiment of the disclosure, when the total load corresponds to the third range, the states of the fourth and second cells having the lowest power consumption efficiencies from among the plurality of cells may be maintained in an inactive state and the state of the first cell having the second highest power consumption efficiency after the third cell from among the plurality of cells may be changed from an inactive state to an active state. In an embodiment of the disclosure, some of one or more UEs having been connected to the third cell may be connected to the first cell. For example, some of the one or more UEs having been connected to the third cell may be connected to the first cell having a lower load, in consideration of load balancing. As another example, some of the one or more UEs having been connected to the third cell may be continuously connected to the third cell having a higher power consumption efficiency compared to the first cell.

Referring to the third graph 620b, in an embodiment of the disclosure, the total load of the plurality of cells may be increased over time. For example, as shown in the third graph 620b, the total load of the plurality of cells may correspond to a second range greater than or equal to the second threshold value and less than a first threshold value. According to an embodiment of the disclosure, when the total load corresponds to the second range, the state of the fourth cell having the lowest power consumption efficiency from among the plurality of cells may be maintained in an inactive state and the states of the first and second cells other than the fourth cell and the third cell in the active state may be changed from an inactive state to an active state. In an embodiment of the disclosure, some of the one or more UEs having been connected to the third cell may be connected to the first or second cell. For example, some of the one or more UEs having been connected to the third cell may be connected to the first or second cell having a lower load, in consideration of load balancing. As another example, some of the one or more UEs having been connected to the third cell may be connected to the first cell having a higher power consumption efficiency compared to the second cell, or be continuously connected to the third cell.

Referring to the fourth graph 620c, in an embodiment of the disclosure, the total load of the plurality of cells may be increased over time. For example, as shown in the fourth graph 620c, the total load of the plurality of cells may correspond to a first range greater than or equal to the first threshold value. According to an embodiment of the disclosure, when the total load corresponds to the first range, the plurality of cells may be in an active state. For example, the states of the first, second, and fourth cells other than the third cell in an active state may be changed from an inactive state to an active state. In an embodiment of the disclosure, some of the one or more UEs having been connected to the third cell may be connected to the first, second, or fourth cell. For example, some of the one or more UEs having been connected to the third cell may be connected to the first, second, or fourth cell having a lower load, in consideration of load balancing. As another example, some of the one or more UEs having been connected to the third cell may be connected to the first or second cell having a higher power consumption efficiency compared to the fourth cell, or be continuously connected to the third cell.

Figure 7:
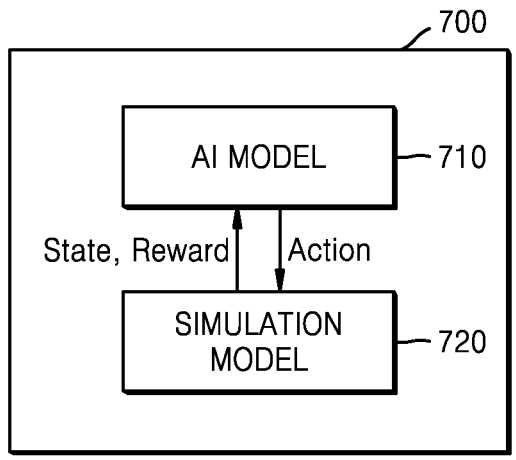
FIG. 7 is a diagram illustrating an example method of training an artificial intelligence (AI) model used to control states of a plurality of cells, according to various embodiments.

FIG. 7 is a diagram illustrating an example method of training an AI model used to control states of a plurality of cells, according to various embodiments.

Referring to FIG. 7, an AI training module 700 may include an AI model 710 and a simulation model 720. According to an embodiment of the disclosure, the AI training module 700 may be understood as a module the same as or similar to the AI training module 265 of FIG. 2 or the AI training module 365 of FIG. 3.

According to an embodiment of the disclosure, the AI training module 700 may train the AI model 710 using the simulation model 720. For example, the AI model 710 may be a model to be trained using, for example, and without limitation, reinforcement learning, and obtain information about a state variable from the simulation model 720. The AI model 710 may calculate an action variable based on the obtained information about the state variable, and transmit information about the calculated action variable to the simulation model 720. The simulation model 720 may perform simulation and calculate a reward variable based on the received information about the action variable, and transmit information about the calculated reward variable to the AI model 710. The AI model 710 may be trained by performing reinforcement learning based on the received reward variable.

According to an embodiment of the disclosure, the state variable may include, for example, and without limitation, at least one of a total load of a plurality of cells (e.g., total PRB usage of the plurality of cells), a state of each of the plurality of cells (e.g., information indicating whether to activate each of the plurality of cells), power consumption of each of the plurality of cells, or a network performance indicator of the plurality of cells (e.g., a KPI of a mobile carrier).

According to an embodiment of the disclosure, the action variable may include threshold ratio values for distinguishing between a plurality of ranges based on a ratio of the total load to a maximum total load of the plurality of cells. For example, the action variable may include a first threshold ratio value for distinguishing between a first range and a second range, a second threshold ratio value for distinguishing between the second range and a third range, and a third threshold ratio value for distinguishing between the third range and a fourth range.

According to an embodiment of the disclosure, the reward variable may include total power consumption of the plurality of cells or a network performance indicator. For example, the reward variable may be increased when the power consumption is reduced, and be reduced when the network performance indicator is reduced. In an embodiment of the disclosure, an increase or decrease in the reward variable based on the change in the power consumption or the network performance indicator may be calculated by applying different weights to the power consumption and the network performance indicator. In various embodiments of the disclosure, the weight for the power consumption may be higher than the weight for the network performance indicator when priority is given to reduction in the power consumption compared to the network performance indicator, or the weight for the network performance indicator may be higher than the weight for the power consumption when priority is given to the network performance indicator compared to reduction in the power consumption.

In various embodiments of the disclosure, the AI model 710 may calculate the action variable capable of maximizing the value of the reward variable.

Figure 8:
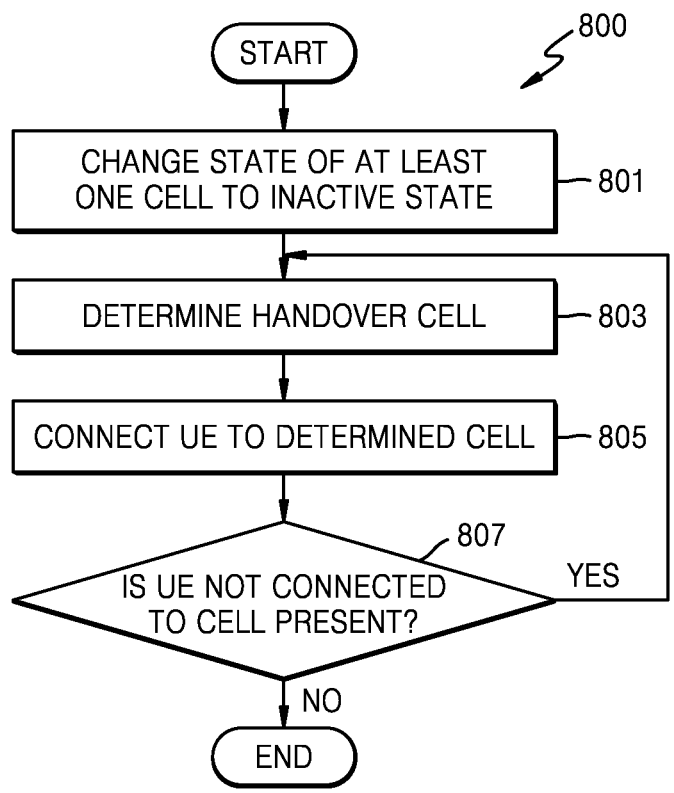
FIG. 8 is a flowchart illustrating an example method of controlling a plurality of cells in response to a change in a state of at least one cell, according to various embodiments.

FIG. 8 is a flowchart illustrating an example method of controlling a plurality of cells in response to a change in a state of at least one cell, according to various embodiments.

Referring to FIG. 8, a method 800, performed by an electronic device, of controlling a plurality of cells in response to a change in a state of at least one cell may include operations 801, 803, 805 and 807 (which may be referred to hereinafter as operations 801 to 807). According to various embodiments of the disclosure, the method 800 is not limited to that illustrated in FIG. 8. For example, the method 800 may further include operations not illustrated in FIG. 8, or omit at least some of the operations illustrated in FIG. 8. In various embodiments of the disclosure, operations 801 to 807 may be understood as being performed by the electronic device 200 of FIG. 2 or the server 300 of FIG. 3.

In operation 801, the electronic device may change a state of at least one cell from an active state to an inactive state. For example, the electronic device may change the state of the at least one cell from among the plurality of cells from an active state to an inactive state, based on a total load of the plurality of cells.

In operation 803, the electronic device may determine a handover cell to which a UE having been connected to the at least one cell whose state is changed is to be handed over, in response to the change in the state of the at least one cell to an inactive state in operation 801. For example, the electronic device may determine any one cell to which the UE is reconnected, from among other active cells. According to an embodiment of the disclosure, the electronic device may determine a cell having the highest power consumption efficiency, e.g., a cell having the lowest power consumption per RB, from among the active cells as the handover cell in such a manner that the UE is preferentially connected to the cell having the highest power consumption efficiency.

In operation 805, the electronic device may control the handover cell determined in operation 803 in such a manner that the UE having been connected to the at least one cell whose state is changed is connected to the determined handover cell.

In operation 807, the electronic device may determine whether a UE not connected to any one cell from among the plurality of cells is present. For example, the electronic device may determine whether a UE not connected to any other active cell is present from among one or more UEs having been connected to the at least one cell whose state is changed to an inactive state in operation 801. In an embodiment of the disclosure, the electronic device may return to operation 803 upon determining that a UE not connected to any cell is present ("Yes" in operation 807), or terminate the procedure upon determining that a UE not connected to any cell is not present ("No" in operation 807).

FIG. 9 is a flowchart illustrating an example method of controlling a plurality of cells in response to a change in a state of at least one cell, according to various embodiments.

Referring to FIG. 9, a method 900, performed by an electronic device, of controlling a plurality of cells in response to a change in a state of at least one cell may include operations 901, 903, 905, 907, 908, 909, 910 and 911 (which may be referred to hereinafter as operations 901 to 911). According to various embodiments of the disclosure, the method 900 is not limited to that illustrated in FIG. 9. For example, the method 900 may further include operations not illustrated in FIG. 9, or omit at least some of the operations illustrated in FIG. 9. In various embodiments of the disclosure, operations 901 to 911 may be understood as being performed by the electronic device 200 of FIG. 2 or the server 300 of FIG. 3.

In operation 901, the electronic device may change a state of at least one cell from an active state to an inactive state. For example, the electronic device may change the state of the at least one cell from among the plurality of cells from an active state to an inactive state, based on a total load of the plurality of cells.

In operation 903, the electronic device may calculate a variance between loads of active cells. For example, the electronic device may determine whether load balancing between the active cells is sufficiently achieved.

In operation 905, the electronic device may compare the variance calculated in operation 903 to a previously designated threshold value. In an embodiment of the disclosure, when the calculated variance is greater than or equal to the designated threshold value ("Yes" in operation 905), the electronic device may determine that load balancing between the active cells is not sufficiently achieved. In this case, the electronic device may proceed to operation 907. In an embodiment of the disclosure, when the calculated variance is less than the designated threshold value ("No" in operation 905), the electronic device may determine that load balancing between the active cells is sufficiently achieved. In this case, the electronic device may proceed to operation 908.

In operation 907, the electronic device may determine a cell currently having the lowest load as a handover cell, in consideration of load balancing between the active cells.

In operation 909, the electronic device may control a UE having been connected to the at least one cell whose state is changed to an inactive state in operation 901, to be preferentially connected to the cell having the lowest load from among the active cells. As such, load balancing between the plurality of cells may be improved.

In operation 908, the electronic device may determine a cell having the highest power consumption efficiency, e.g., a cell having the lowest power consumption per RB, from among the active cells as a handover cell.

In operation 910, the electronic device may control a UE having been connected to the at least one cell whose state is changed to an inactive state in operation 901, to be preferentially connected to the cell having the highest power consumption efficiency from among the active cells. As such, total power consumption of the plurality of cells may be reduced.

In operation 911, the electronic device may determine whether a UE not connected to any one cell from among the plurality of cells is present. For example, the electronic device may determine whether a UE not connected to any other active cell is present from among one or more UEs having been connected to the at least one cell whose state is changed to an inactive state in operation 901. In an embodiment of the disclosure, the electronic device may return to operation 903 upon determining that a UE not connected to any cell is present ("Yes" in operation 911), or terminate the procedure upon determining that a UE not connected to any cell is not present ("No" in operation 911).

According to an example embodiment of the disclosure, a method, performed by an electronic device, of controlling a plurality of cells for providing radio resources to a plurality of user equipments (UEs), includes: obtaining information about a load of each of the plurality of cells, calculating a total load of the plurality of cells based on the obtained information, changing a state of at least one cell from among the plurality of cells from an active state to an inactive state or from an inactive state to an active state based on the calculated total load, and controlling the plurality of cells so that the plurality of UEs are connected to active cells from among the plurality of cells in response to the change in the state of the at least one cell.

The method may further include determining a range corresponding to the calculated total load from among a plurality of ranges set based on a ratio of a total load to a maximum total load of the plurality of cells, and the at least one cell may be determined based on information indicating whether to activate each of the plurality of cells in the determined range.

The information indicating whether to activate each of the plurality of cells in each of the plurality of ranges may be set based on power consumption efficiency of each of the plurality of cells. In a range where the ratio of the total load to the maximum total load is less than a first threshold ratio from among the plurality of ranges, a state of a first cell having a lowest power consumption efficiency from among the plurality of cells may be set to an inactive state. In a range where the ratio of the total load to the maximum total load is less than a second threshold ratio less than the first threshold ratio from among the plurality of ranges, states of the first cell and a second cell having a lowest power consumption efficiency from among the plurality of cells other than the first cell may be set to an inactive state.

At least one threshold ratio value for distinguishing between the plurality of ranges may be set by an artificial intelligence (AI) model. The AI model may use, as an input, at least one of the information about the load of each of the plurality of cells, the calculated total load, the maximum total load, power consumption efficiency of each of the plurality of cells, or a network performance indicator of the plurality of cells.

The information about the load of each of the plurality of cells may be based on physical resource block (PRB) usage of each of the plurality of cells.

According to an embodiment of the disclosure, the controlling of the plurality of cells may include controlling the plurality of cells so that at least one UE having been connected to the at least one cell is preferentially connected to a cell having a lowest power consumption per resource block (RB) from among the active cells when the state of the at least one cell is changed from an active state to an inactive state.

The controlling of the plurality of cells may include calculating a variance of loads of the active cells when the state of the at least one cell is changed from an active state to an inactive state, and controlling the plurality of cells in such a manner that at least one UE having been connected to the at least one cell is preferentially connected to a cell having a lowest load from among the active cells when the calculated variance is greater than or equal to a threshold value, or that at least one UE having been connected to the at least one cell is preferentially connected to a cell having a lowest power consumption per RB from among the active cells when the calculated variance is less than the threshold value.

According to an example embodiment of the disclosure, an electronic device for controlling a plurality of cells for providing radio resources to a plurality of user equipments (UEs) includes: the plurality of cells, a memory, and at least one processor electrically connected to the memory and the plurality of cells, the processor configured to control the electronic device to: obtain information about a load of each of the plurality of cells, calculate a total load of the plurality of cells based on the obtained information, change a state of at least one cell from among the plurality of cells from an active state to an inactive state or from an inactive state to an active state based on the calculated total load, and control the plurality of cells so that the plurality of UEs are connected to active cells from among the plurality of cells in response to the change in the state of the at least one cell.

The at least one processor may be further configured to determine a range corresponding to the calculated total load from among a plurality of ranges set based on a ratio of a total load to a maximum total load of the plurality of cells, and wherein the at least one cell is determined based on information indicating whether to activate each of the plurality of cells in the determined range. The information indicating whether to activate each of the plurality of cells in each of the plurality of ranges may be set based on power consumption efficiency of each of the plurality of cells. In a range where the ratio of the total load to the maximum total load is less than a first threshold ratio from among the plurality of ranges, a state of a first cell having a lowest power consumption efficiency from among the plurality of cells may be set to an inactive state. In a range where the ratio of the total load to the maximum total load is less than a second threshold ratio less than the first threshold ratio from among the plurality of ranges, states of the first cell and a second cell having a lowest power consumption efficiency from among the plurality of cells other than the first cell may be set to an inactive state.

At least one threshold ratio value for distinguishing between the plurality of ranges may be set by an artificial intelligence (AI) model. The AI model may use, as an input, at least one of the information about the load of each of the plurality of cells, the calculated total load, the maximum total load, power consumption efficiency of each of the plurality of cells, or a network performance indicator of the plurality of cells.

The information about the load of each of the plurality of cells may be based on physical resource block (PRB) usage of each of the plurality of cells.

The at least one processor may be further configured to control the electronic device to control the plurality of cells so that at least one UE having been connected to the at least one cell is preferentially connected to a cell having a lowest power consumption per resource block (RB) from among the active cells when the state of the at least one cell is changed from an active state to an inactive state.

The at least one processor may be further configured to calculate a variance of loads of the active cells when the state of the at least one cell is changed from an active state to an inactive state, and to control the electronic device to control the plurality of cells so that at least one UE having been connected to the at least one cell is preferentially connected to a cell having a lowest load from among the active cells when the calculated variance is greater than or equal to a threshold value, or that at least one UE having been connected to the at least one cell is preferentially connected to a cell having a lowest power consumption per RB from among the active cells when the calculated variance is less than the threshold value.

It should be understood that the various embodiments of the disclosure and the terms used therein are not intended to limit technical features set forth herein to specific embodiments of the disclosure and include various modifications, equivalents, and/or alternatives thereof. In the drawings, like reference numerals may denote like elements. Singular forms are intended to include plural forms as well, unless the context clearly indicates otherwise. As used herein, the expression such as "A or B", "at least one of A and/or B", "A, B or C", or "at least one of A, B and/or C" may include all possible combinations of the listed items. The expressions such as "first", "second", "1st", and "2nd" used herein may refer to various different elements irrespective of the order and/or priority thereof, and are merely used to distinguish one element from another without limiting the elements. It will be understood that, when an element (e.g., a first element) is referred to as being "(operatively or communicatively) coupled to" or "connected to" another element (e.g., a second element), the element can be coupled or connected to the other element directly or via another element (e.g., a third element).

As used herein, the term "module" may include a unit configured as hardware, software, or firmware, or any combination thereof, and be used interchangeably with, for example, the term "logic," "logic block," "component," or "circuit". A module may be a single integral component, the smallest unit for performing one or more functions, or a part thereof. For example, the module may be configured as an application-specific integrated circuit (ASIC).

The various embodiments of the disclosure may be implemented by software including instructions stored in a machine-readable (e.g., computer-readable) storage medium (e.g., an embedded memory or an external memory). The machine is a device capable of retrieving the instructions from the storage medium and operating according to the retrieved instructions, and may include an electronic device according to the disclosed embodiments of the disclosure. When the instructions are executed by a processor, functions corresponding to the instructions may be performed directly by the processor, or using other elements under the control of the processor. The instructions may include codes generated by a compiler or codes executable by an interpreter. The machine-readable storage medium may be provided in the form of a non-transitory storage medium. When the storage medium is 'non-transitory', the storage medium may not include signals and is tangible, and it does not limit that data is semi-permanently or temporarily stored in the storage medium.

According to an embodiment of the disclosure, the method according to the various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be electronically distributed (via an application store (e.g., Play Store™). For electronic distribution, at least a part of the computer program product may be temporarily generated or be at least temporarily stored in a machine-readable storage medium such as a memory of a server of a manufacturer, a server of an application store, or a relay server.

Each of elements (e.g., modules or programs) according to the various embodiments of the disclosure may be configured as one or more entities, and some of the plurality of sub elements may be omitted or other sub elements may be added to the various embodiments of the disclosure. Alternatively or additionally, some elements (e.g., modules or programs) may be integrated into a single entity and the integrated entity may equally or similarly perform functions of the elements before being integrated. According to various embodiments of the disclosure, operations performed by modules, programs, or other elements may be carried out sequentially, in parallel, repeatedly, or heuristically, or at least some of the operations may be performed in a different order, be omitted, or be added with other operations.

Functions associated with AI according to the disclosure are performed using a processor and a memory. The processor may include one or more processors. In this case, the one or more processors may include general-purpose processors such as central processing units (CPUs), application processors (APs), and digital signal processors (DSPs), dedicated graphics processors such as graphics processing units (GPUs) and vision processing units (VPUs), or dedicated AI processors such as neural processing units (NPUs). The one or more processors control input data to be processed according to a predefined operation rule or AI model stored in the memory. Alternatively, when the one or more processors are dedicated AI processors, the dedicated AI processors may be designed in a hardware structure specialized for processing of a specific AI model.

The predefined operation rule or AI model is made through training. Herein, being made through training may refer, for example, to a basic AI model being trained based on a learning algorithm using multiple pieces of training data and thus a predefined operation rule or AI model configured to achieve desired characteristics (or purposes) is made. The training may be performed directly by a machine having an AI function according to the disclosure, or via a separate server and/or system. Examples of the learning algorithm may include supervised learning, unsupervised learning, semi-supervised learning, and reinforcement learning, but are not limited thereto.

The AI model may include a plurality of neural network layers. Each of the plurality of neural network layers has a plurality of weight values and performs neural network computation through computation between a computation result of a previous layer and the plurality of weight values. The plurality of weight values of the plurality of neural network layers may be optimized based on a result of training the AI model. For example, the plurality of weight values may be updated to reduce or minimize a loss value or a cost value obtained by the AI model during the training process. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

In a method, performed by an electronic device, of controlling a plurality of cells for providing radio resources to a plurality of UEs, according to the disclosure, as a method of inferring or predicting threshold ratio values for distinguishing between a plurality of ranges related to a total load of the plurality of cells, an AI model may be used to optimize data processing information for representing the threshold ratio values as a result using information related to a state of each of the plurality of cells and information related to a network state. The processor may pre-process and transform the data to a form appropriately usable as an input of the AI model. The AI model may be made through training. Herein, being made through training may refer, for example, to a basic AI model being trained based on a learning algorithm using multiple pieces of training data and thus a predefined operation rule or AI model configured to achieve desired characteristics (or purposes) is made. The AI model may include a plurality of neural network layers. Each of the plurality of neural network layers has a plurality of weight values and performs neural network computation through computation between a computation result of a previous layer and the plurality of weight values.

Reasoning/prediction may refer, for example, to a technology for judging and logically inferring and predicting information, and includes knowledge/probability-based reasoning, optimization prediction, preference-based planning, recommendation, etc.

According to the embodiments of the disclosure, in relation to a plurality of cells for providing radio resources to a plurality of UEs, total power consumption may be reduced and efficiency of a wireless communication service may be increased. In addition, concentration of load on a specific cell may be prevented and/or reduced and thus reduction in total network performance may also be prevented and/or reduced.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

The invention claimed is:

1. A method, performed by an electronic device, of controlling a plurality of cells for providing radio resources to a plurality of user equipments (UEs), the method comprising:
    obtaining information about a load of each of the plurality of cells;
    calculating a total load of the plurality of cells based on the obtained information;
    changing a state of at least one cell from among the plurality of cells from an active state to an inactive state or from an inactive state to an active state based on the calculated total load and power consumption efficiency of each of the plurality of cells; and
    controlling the plurality of cells so that the plurality of UEs are connected to active cells from among the plurality of cells in response to the change in the state of the at least one cell,
    wherein based on a ratio of the total load to a maximum total load being less than a first threshold ratio, a state of a first cell having a lowest power consumption efficiency from among the plurality of cells is set to an inactive state.

2. The method of claim 1, further comprising: determining each of a plurality of ranges a corresponding to the calculated total load set based on the ratio of the total load to the maximum total load of the plurality of cells,
    wherein the at least one cell is determined based on information indicating whether to activate each of the plurality of cells in the determined plurality of ranges.

3. The method of claim 2, wherein at least one threshold ratio value for distinguishing between the plurality of ranges is set by an artificial intelligence (AI) model.

4. The method of claim 3, wherein the AI model is configured to use, as an input, at least one of the information about the load of each of the plurality of cells, the calculated total load, the maximum total load, power consumption efficiency of each of the plurality of cells, or a network performance indicator of the plurality of cells.

5. The method of claim 1, wherein, if the ratio of the total load to the maximum total load is less than a second threshold ratio less than the first threshold ratio, states of the first cell and a second cell having a second lowest power consumption efficiency from among the plurality of cells are set to an inactive state.

6. The method of claim 1, wherein the information about the load of each of the plurality of cells is based on physical resource block (PRB) usage of each of the plurality of cells.

7. The method of claim 1, wherein the controlling of the plurality of cells comprises: controlling the plurality of cells so that at least one UE having been connected to the at least one cell is preferentially connected to a cell having a lowest power consumption per resource block (RB) from among the active cells based on the state of the at least one cell being changed from an active state to an inactive state.

8. The method of claim 1, wherein the controlling of the plurality of cells comprises:

calculating a variance of loads of the active cells based on the state of the at least one cell being changed from an active state to an inactive state; and controlling the plurality of cells so that at least one UE having been connected to the at least one cell is preferentially connected to a cell having a lowest load from among the active cells based on the calculated variance being greater than or equal to a threshold value, or that at least one UE having been connected to the at least one cell is preferentially connected to a cell having a lowest power consumption per resource block (RB) from among the active cells based on the calculated variance being less than the threshold value.

9. An electronic device configured to control a plurality of cells to provide radio resources to a plurality of user equipments (UEs), the electronic device comprising:

a memory; and at least one processor electrically connected to the memory and the plurality of cells, the processor configured to control the electronic device to:

obtain information about a load of each of the plurality of cells;

calculate a total load of the plurality of cells based on the obtained information;

change a state of at least one cell from among the plurality of cells from an active state to an inactive state or from an inactive state to an active state based on the calculated total load and power consumption efficiency of each of the plurality of cells;

in response to a ratio of the total load to a maximum total load being less than a first threshold ratio, set a state of a first cell having a lowest power consumption efficiency from among the plurality of cells to an inactive state; and control the plurality of cells so that the plurality of UEs are connected to active cells from among the plurality of cells in response to the change in the state of the at least one cell.

10. The electronic device of claim 9, wherein the at least one processor is further configured to: determine each of a plurality of ranges corresponding to the calculated total load set based on the ratio of the total load to the maximum total load of the plurality of cells, and wherein the at least one cell is determined based on information indicating whether to activate each of the plurality of cells in the determined plurality of ranges.

11. The electronic device of claim 9, wherein the at least one processor is further configured if the ratio of the total load to the maximum total load is less than a second threshold ratio less than the first threshold ratio, to set states of the first cell and a second cell having a second lowest power consumption efficiency from among the plurality of cells to an inactive state.

* * * * *